March 23, 1971    L. ZERNOW    3,572,092
PULSED HOT WIRE SYSTEM
Filed June 16, 1969    2 Sheets-Sheet 1

INVENTOR.
LOUIS ZERNOW
BY Harry A. Herbert Jr
ATTORNEY
Henry S. Miller
AGENT

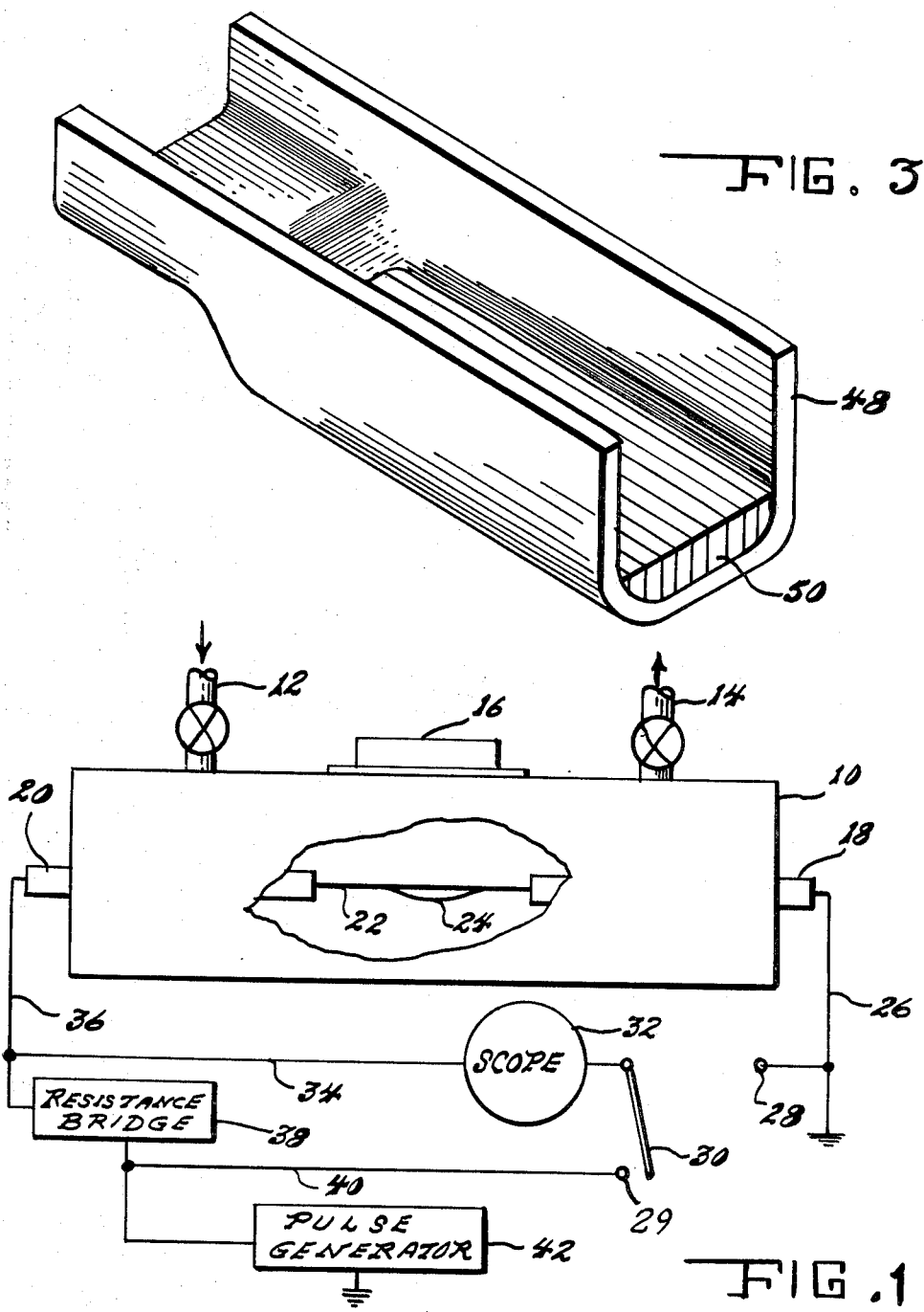

United States Patent Office 3,572,092
Patented Mar. 23, 1971

3,572,092
PULSED HOT WIRE SYSTEM
Louis Zernow, Glendora, Calif., assignor to the United
States of America as represented by the Secretary of
the Air Force
Filed June 16, 1969, Ser. No. 833,507
Int. Cl. G01n 25/00
U.S. Cl. 73—15                                    4 Claims

ABSTRACT OF THE DISCLOSURE

An apparatus for testing micro quantities of biological organisms or chemical compounds including a chamber having a controlled atmosphere, a wire or conductive foil mounted in the chamber for supporting a specimen and connected electrically to a variable pulse generator and a null balanced resistance bridge where the temperature-time history of the specimen can be maintained and measured simultaneously.

BACKGROUND OF THE INVENTION

The invention relates generally to testing of biological and chemical specimens and more specifically to a pulsed hot wire system for measuring and controlling the temperature-time history of biological and chemical specimens.

In view of the advances in medicine and biological research which are now taking place, new and advanced methods of testing have become of great importance. Known methods of studying the effects of heat on biological specimens, as for example sterilization techniques, have become generally outmoded because of the sensitivity of the organisms and chemical compounds involved. Similarly, it has become important of late to develop adequate defenses against biological warfare and it is of extreme importance to be able to know and understand the life cycle of these organisms and the effects of temperature on them. In addition, chemical compounds which are sensitive to high temperatures need methods and equipment sensitive enough to study short duration high temperature environments.

In the past, shuttered arc image furnaces, thermo-electric junctions and semiconductor heating systems have been used in attempts to simulate actual conditions. However these systems, while providing adequate information for some studies, have substantial drawbacks where temperature must be controlled very accurately and raised to a high degree for a very short time. The ability of these devices to duplicate a set of conditions has been shown to be less reliable than is needed. The instant invention solves the disadvantages of prior art devices because of the inherent ease and simplicity with which it controls temperature-time histories of sensitive materials. Likewise, the instant invention provides a self-measuring method for testing specimens which does not require separate temperature sensing instrumentation. Additionally, it is possible to obtain data in a closely controlled environment which is of the utmost importance, in that environment frequently has significant effects upon the thermal decomposition kinetics of biological life.

SUMMARY OF THE INVENTION

The invention provides means for measuring the thermal reactivity and stability of micro-quantities of sensitive chemical and biological materials. A thin platinum resistance wire or coil is placed in a controlled environment and connected to an electronic circuit. The circuit provides a known pulse energy which passes through the wire, thereby causing the wire to become heated. By changing the duration of the pulse and the heat of the wire the amount of heating and length of heating is very accurately controlled. The specimen is placed on the wire and is correspondingly heated as the wire is heated. Once a calibration has been made of the device, it is very easy to reproduce exactly the same conditions. With this relatively simple system, problems of residual heating are eliminated. Likewise having a sealed atmosphere, problems with regard to environmental effects are eliminated.

Therefore, an object of this invention is to provide an apparatus for exposing biological and chemical specimens to controlled heating in a well defined temperature-time history in the millisecond range.

It is a further object of this invention to provide a new and improved means to evaluate the effects of temperature and time upon the viability of biological life.

It is another object of this invention to provide a new and improved means for testing biological and chemical specimens which does not require separate temperature sensing instruments.

It is still another object of this invention to provide a means of measuring thermal decomposition of microgram quantities of substances.

It is still another object of this invention to provide a means for studying the effects of temperature on specimens in a controlled environment.

It is another object of this invention to provide a new and improved means for testing micro-quantities that is lightweight, inexpensive and easily mass produced.

It is still another object of this invention to provide a new and improved testing system which will accurately reproduce known time temperature conditions.

These and other advantages, features and objects of the invention will become more apparent from the following description taken in connection with the illustrative embodiment in the accompanying drawings.

BRIEF DESCRIPTION OF THE DRAWINGS

FIG. 1 is a diagrammatical representation of the invention;

FIG. 3 is an enlarged perspective view of aluminum foil specimen holder used in the invention;

DESCRIPTION OF THE PREFERRED EMBODIMENT

Figure 4A:
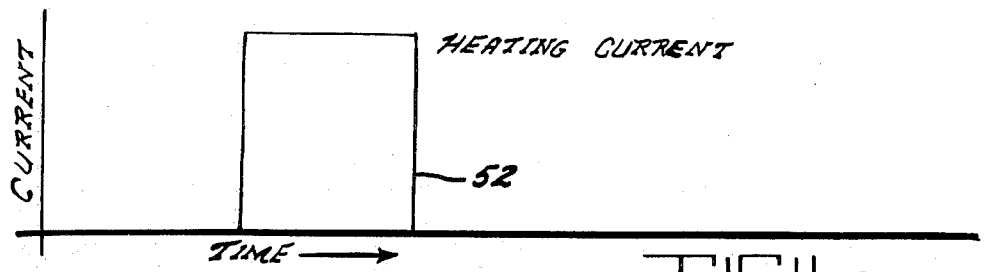
FIG. 4a is a graph representing a pulse current used in the invention.

Referring now to FIG. 1, a controlled environmental chamber is shown at 10. Inlet means 12 and outlet means 14 provide appropriate access for an environmental conditioning system whereby temperature, humidity and general condition of the ambient atmosphere may be controlled. A sample insertion enclosure 16 is provided at the top of the chamber to allow specimens to be inserted. Electrical insulators 18 and 20 enter the chamber through sealed openings and support the input leads 26 and 36. Connecting the insulators beneath the sample insertion enclosure is a sample support means 22 shown in the figure as a platinum wire with a sample 24 suspended thereon. The lead 36 is connected to a null balance resistance bridge 38 and thence to the pulse generator 42. The lead 26 is connected to contact 28 of the switch 30. Switch 30 is further connected to the oscilloscope 32 and thence to the line 30 by line 34. Line 41 connects the pulse generator 42 with the resistance bridge 38. Line 40 is connected to line 41 and thence to contact 29 through switch 30.

In operation, a sample of thermally sensitive material is placed on the specimen holder which may be, for example, platinum wire or foil, in a controlled environment. A current pulse from pulse generator 42 passes through the null balance resistance bridge 38 and on through the specimen 24. When the pulse is applied, the temperature of the wire increases. The resistance of the wire increases with the wire temperature providing direct information on the temperature-timing history of the wire. The temperature of a platinum wire subjected to a pulse of current will rise and its resistance will also increase, in accordance with the following relationships:

$$T = T_o + (mC)^{-1} \int_{t_o}^{t_f} i^2(t) R(t) dt$$

where $C_p$ is the heat capacity of the wire
$m$ is the mass of the wire
$i$ is the current through the wire.

Oscilloscope 32, by means of switch 30, in position 29 provides accurate information regarding the change of resistance in the specimen support as measured by the null balance resistance bridge 38. The temperature is correlated to the resistance of the specimen support. With switch 30 in position 28 the oscilloscope displays the shape of the pulse emanating from the pulse generator 42.

Once the instrument has been calibrated using various pulse heights and pulse widths to determine the change of temperature in the wire, it is possible to duplicate any particular set of conditions for which the system has been calibrated. In order to perform tests and experiments, sample insertion is made through the rubber covered aperture at the top, using a micro burette type hypodermic syringe for accurate volume measurements.

Figure 2:
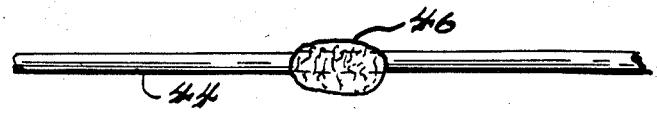
FIG. 2 is a side elevation view partly in section of the platinum wire used in the invention.

Concerning FIG. 2, there is shown an enlarged view of a chemical or biological specimen 46 on a platinum wire 44. Specimen would generally be in the form of a drop of liquid, while the wire will be generally 5 to 10 mils in diameter.

FIG. 3 shows a sample 50 located in a foil which may be of 1 to 2 mils thickness. It is possible to use slightly larger quantities of sample material when using the foil boat shown without diminishing the test results.

Figure 4B:
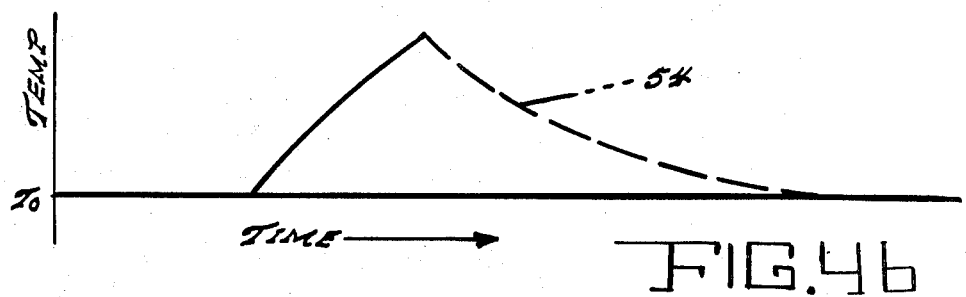
FIG. 4b is a graph representing the corresponding temperature decay.
Figure 5A:
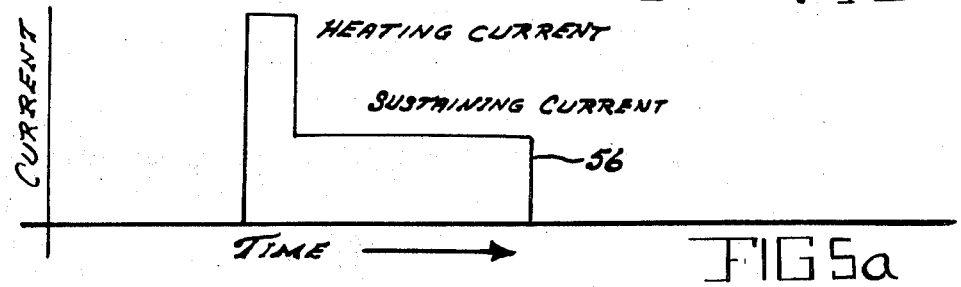
FIG. 5a is a graphic representation of a stepped pulse current used in the invention.
Figure 5B:
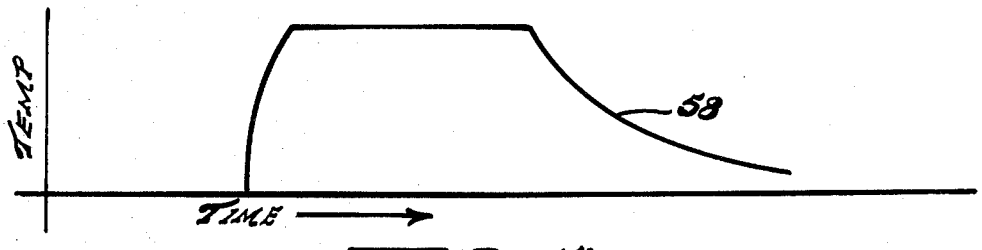
FIG. 5b is a graph representing the corresponding temperature change.

One of the important features of the instant invention is that the current pulse can be applied very quickly compared to the important temperature decay processes (e.g., radiation, conduction and convection), so that the temperature-time history will be approximated by a relationship such as is shown in FIG. 4. The heating pulse is shown at 52 while the temperature diminishes as shown at 54. In any case, the resistance of the wire itself will correlate with the wire temperature through $$R_t = R_o[1 + \alpha(T_1 - T_o)]$$

where $\alpha$ = temperature coefficient of resistance
$T_f$ = final wire temperature
$T_o$ = initial wire temperature
$R_o$ = initial resistance and monitoring its variation as a function of time will provide direct information on wire temperature-time history. A possible alternative method would permit a stepped current pulse to be applied as shown in FIG. 5. The first portion of the stepped current pulse 56 would bring the wire to the desired temperature. The second step would be adjusted to compensate exactly for the heat losses (58) at the desired temperature, thereby providing a controlled duration at a constant temperature. The pulses hot wire system can however be used without the refinement, so long as the temperature-time history is known.

The problem of obtaining the necessary heat transfer to the specimen agent offers a few difficulties which can however be overcome if very thin layers of the agent are placed in contact with the wire, i.e. if the thermal capacity of the agent is small compared to that of the wire. The wire temperature and the agent temperature are not identical. However, to the extent that the agent layer is very thin, and has a small thermal capacity relative to the wire, and a reasonable thermal diffusivity, temperature equilibrium is quickly attained, and the wire temperature may also be treated as the sample temperature. If necessary, more uniform heating could be obtained by sandwiching the sample between two resistance wires or foils.

Having thus described a method and apparatus for testing micro-quantities of biological and chemical specimens, I claim as my invention the following:

1. A system for heating test specimens to high temperatures for short periods and measuring the temperature-time history of the specimens comprising a container having a controlled environment and an opening in the container to facilitate the adding and removing of material to be tested; an electrically conductive means mounted in the container and in an insulated relationship with the container for holding specimens; a variable pulse generator connected to the said conductive means, to apply current to the holder over a period of time that is short compared to the temperature decay process of the test specimen and holder, a null balance resistance bridge connected between the pulse generator and the electrically conductive means to sense changes in the resistance of the said conductive means.

2. A system for heating test specimens according to claim 1, further including: an oscilloscope connected across the resistance bridge for visually displaying the resistance change in the specimen holding means.

3. A system for heating test specimens according to claim 1 wherein the electrically conductive specimen holding means is a platinum wire.

4. A system for heating test specimens according to claim 1 wherein the electrically conductive specimen holding means is a platinum foil.

References Cited

UNITED STATES PATENTS

| | | | |
|---|---|---|---|
| 2,551,624 | 5/1951 | Moore | 73—15 |
| 2,899,282 | 8/1959 | Eyraud | 23—255 |
| 3,028,747 | 4/1962 | Verderame et al. | 73—15 |

JAMES J. GILL, Primary Examiner

H. GOLDSTEIN, Assistant Examiner

U.S. Cl. X.R.

195—103.5; 23—254